United States Patent [19]

Densmore

[11] Patent Number: 4,917,232

[45] Date of Patent: Apr. 17, 1990

[54] FLEXIBLE CONVEYOR BELT SUPPORTING STRUCTURE

[75] Inventor: Neal W. Densmore, Franklin, Pa.

[73] Assignee: Joy Technologies Inc., Pittsburgh, Pa.

[21] Appl. No.: 207,010

[22] Filed: Jun. 13, 1988

Related U.S. Application Data

[63] Continuation of Ser. No. 593,178, Mar. 26, 1984, abandoned, which is a continuation of Ser. No. 145,958, May 2, 1980, abandoned.

[51] Int. Cl.$^4$ .............................................. B65G 15/08
[52] U.S. Cl. .................................. 198/830; 198/808; 198/831; 198/840; 198/861.2
[58] Field of Search ............... 198/808, 830, 831, 839, 198/840, 861.2

[56] References Cited

U.S. PATENT DOCUMENTS

| | | | |
|---|---|---|---|
| 701,833 | 6/1902 | Bronder | 198/808 X |
| 779,666 | 1/1905 | Robins | 198/501 |
| 1,705,558 | 3/1929 | Cuddihy | 198/808 |
| 2,101,017 | 12/1937 | Bebinger | 198/830 |
| 2,132,083 | 10/1938 | Sollenberger | 198/808 |
| 2,686,589 | 8/1934 | Temple | 198/831 |
| 2,759,596 | 8/1956 | Keller | 198/830 |
| 3,327,839 | 6/1967 | Sigety et al. | 198/835 |
| 3,545,598 | 12/1970 | McGinnis | 198/823 |
| 3,701,411 | 10/1972 | McGinnis | 198/823 X |
| 3,831,752 | 12/1974 | Densmore | 198/824 X |
| 3,972,414 | 8/1976 | Conrad | 198/808 |
| 4,061,223 | 12/1977 | McGinnis | 198/821 |
| 4,227,610 | 10/1980 | Geredes et al. | 198/831 |

FOREIGN PATENT DOCUMENTS

225677 10/1958 Australia ............................. 198/808

Primary Examiner—Joseph E. Valenza
Attorney, Agent, or Firm—E. Wallace Breisch

[57] ABSTRACT

The invention involves flanged rollers which engage the lateral sides of the upper and lower runs of an endless, flexible belt conveyor which traverses a curved path to control movement of the belt laterally of the path of travel.

11 Claims, 2 Drawing Sheets ic conveyors to indicate that the conveying path can be varied, as desired within the limitations of the supporting structure, to permit the conveying run to have a desired horizontal path of travel with one or more curved sections therein. As has been well recognized forces are created within the curved runs of the conveyor belt which forces are sufficient to displace both the inner and outer portions of each run of the curved belt and accordingly it is necessary to provide support for both the outer and inner edges of each conveyor run. Inasmuch as the magnitude direction and effect of such forces in curved conveyor belt runs are known a detailed description thereof is not required to one skilled in the relevant art. It is known that such forces are sufficient to cause excessive wear of the belt edges when supported by certain types of belt supporting idler structures of the prior art.

FLEXIBLE CONVEYOR BELT SUPPORTING STRUCTURE

This application is a continuation of Ser. No. 593,178 filed Mar. 26, 1984, abandoned, which was a continuation of Ser. No. 145,958 filed May 2, 1980, abandoned.

1. Field of the Invention

This invention relates to edge roller and a belt supporting idler structure for use in flexible orbital belt conveyors having an elongated conveying run overlying an elongated return run wherein each run traverses a curved path. More specifically the invention relates to controlling the path of travel of both the conveying and return runs of a coal transporting conveyor in which the horizontal path of travel may be selectively varied, within limits, in a manner to provide satisfactory belt service life.

2. Description of the Prior Art

Applicant is not aware of any prior art directed to the herein described invention; however, prior orbital conveyors in which the conveying and return runs traverse horizontal paths having one or more curved portions therein are well known. As such prior art illustrates the particular horizontal path for a given conveyor may be of various forms and such conveyors are commonly referred to as flexible conveyors to indicate that the conveying path can be varied, as desired within the limitations of the supporting structure, to permit the conveying run to have a desired horizontal path of travel with one or more curved sections therein. As has been well recognized forces are created within the curved runs of the conveyor belt which forces are sufficient to displace both the inner and outer portions of each run of the curved belt and accordingly it is necessary to provide support for both the outer and inner edges of each conveyor run. Inasmuch as the magnitude direction and effect of such forces in curved conveyor belt runs are known a detailed description thereof is not required to one skilled in the relevant art. It is known that such forces are sufficient to cause excessive wear of the belt edges when supported by certain types of belt supporting idler structures of the prior art.

The prior art has attempted to solve the problem of supporting a belt run as it traverses a curve in various manners. U.S. Pat. No. 4,067,439 illustrates a structure using powered edge drives. U.S. Pat. No. 3,310,161 illustrates a structure utilizing edge supporting bands. U.S. Pat. Nos. 3,701,411 and 3,545,598 illustrate a non-standard belt structure and a support structure for such belt. U.S. Pat. No. 3,327,839 illustrates still another type of belt construction. U.S. Pat. No. 779,666 while not illustrating a flexible conveyor does illustrate a belt run supporting structure which has edge guiding idlers for linear conveying and return runs. U.S. Pat. No. 3,863,752 illustrates a linkage mechanism to assist the belt runs to traverse a curve. These prior art attempts to provide belt support for curved runs have in general required expensive and/or non-standard type components which in some instances have not provided sufficient belt life to warrant the cost of using the components or in other instances have been such high cost operating items that they are not practical commercially.

SUMMARY OF THE INVENTION

The invention of this application is to an edge roller and to a belt supporting idler structure which is particularily suited to support both a conveying and return run of a conveyor belt as such runs travel through a curve. As set forth hereinafter the components of this invention are of structures which are readily installed and serviced and does not require frequent maintenance or observation to insure that the structure is functioning properly. More specifically the invention is to an edge roller located outwardly adjacent each side of the conveying and return runs of a orbiting belt conveyor such that a cylindrical surface of each edge roller is engageable by an unsupported overhanging edge of a belt run without any substantial relative movement therebetween. Further each overhanging belt edge is maintained in the desired engagement with a cylindrical surface by spaced flange portions at the ends of each cylindrical surface. In order to support the overhandling edges in accordance with this invention the ends of the belt supporting idler structure are located with respect to the edge rollers so that the belt edges normally engage the cylindrical surface intermediate the edge roller flanges.

Accordingly, one object of this invention is to provide a new and improved edge roller having a cylindrical belt edge engaging surface with belt edge positioning flanges extending outwardly from each end of the cylindrical surface.

Another object of this invention is to provide a new and improved belt supporting structure which supports a run of conveyor belt with overhanging edges and edge rollers are cooperable with such overhanging edges, respectively, to maintain the position of the overhanging edges.

These and other objects of this invention will be better understood upon considering and understanding the following description of a presently preferred embodiment of the invention as illustrated in the accompanying drawings.

DESCRIPTION OF THE PREFERRED EMBODIMENT

Figure 1:
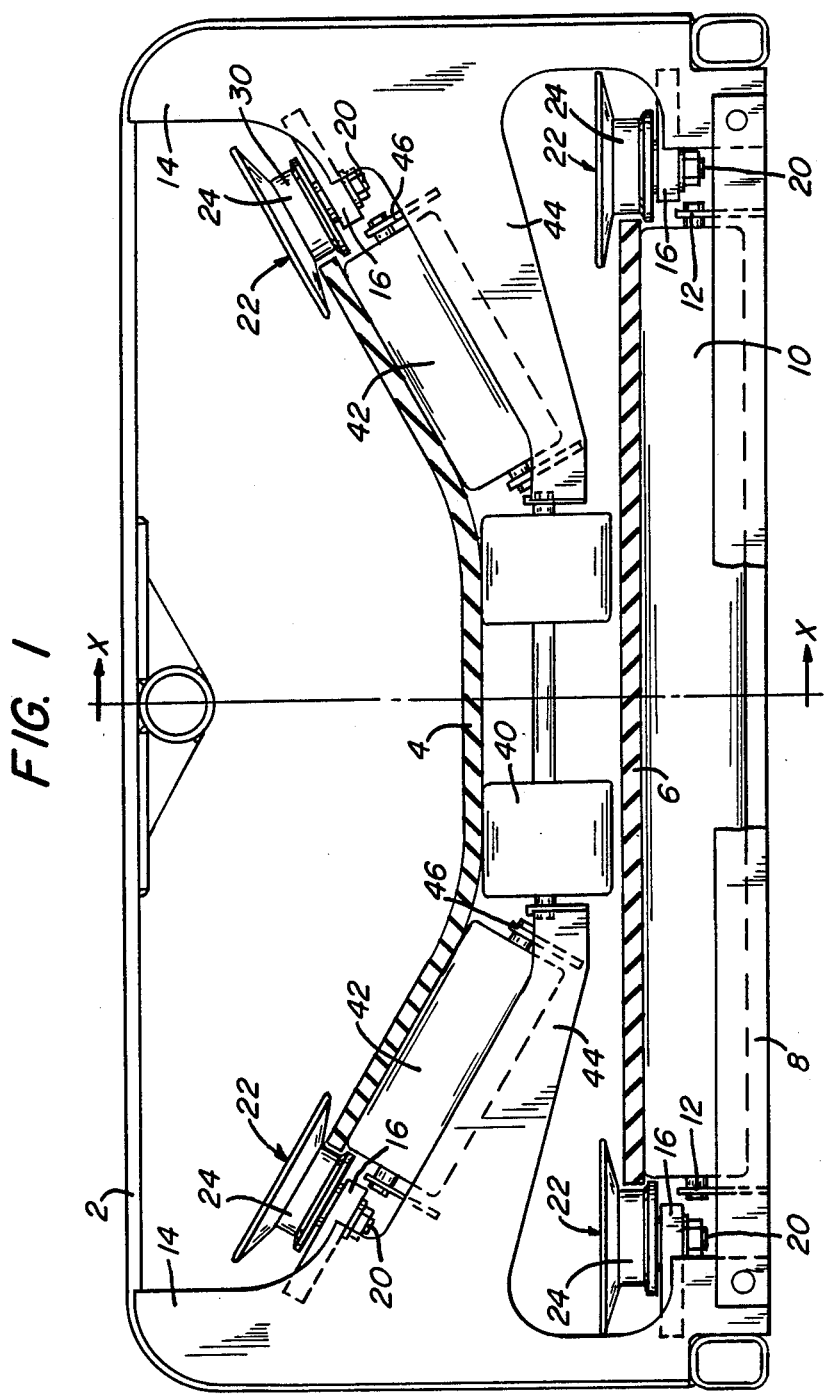
FIG. 1 is a side elevational view of a belt supporting idler structure for supporting the conveying and return runs of an orbital conveyor belt.
Figure 2:
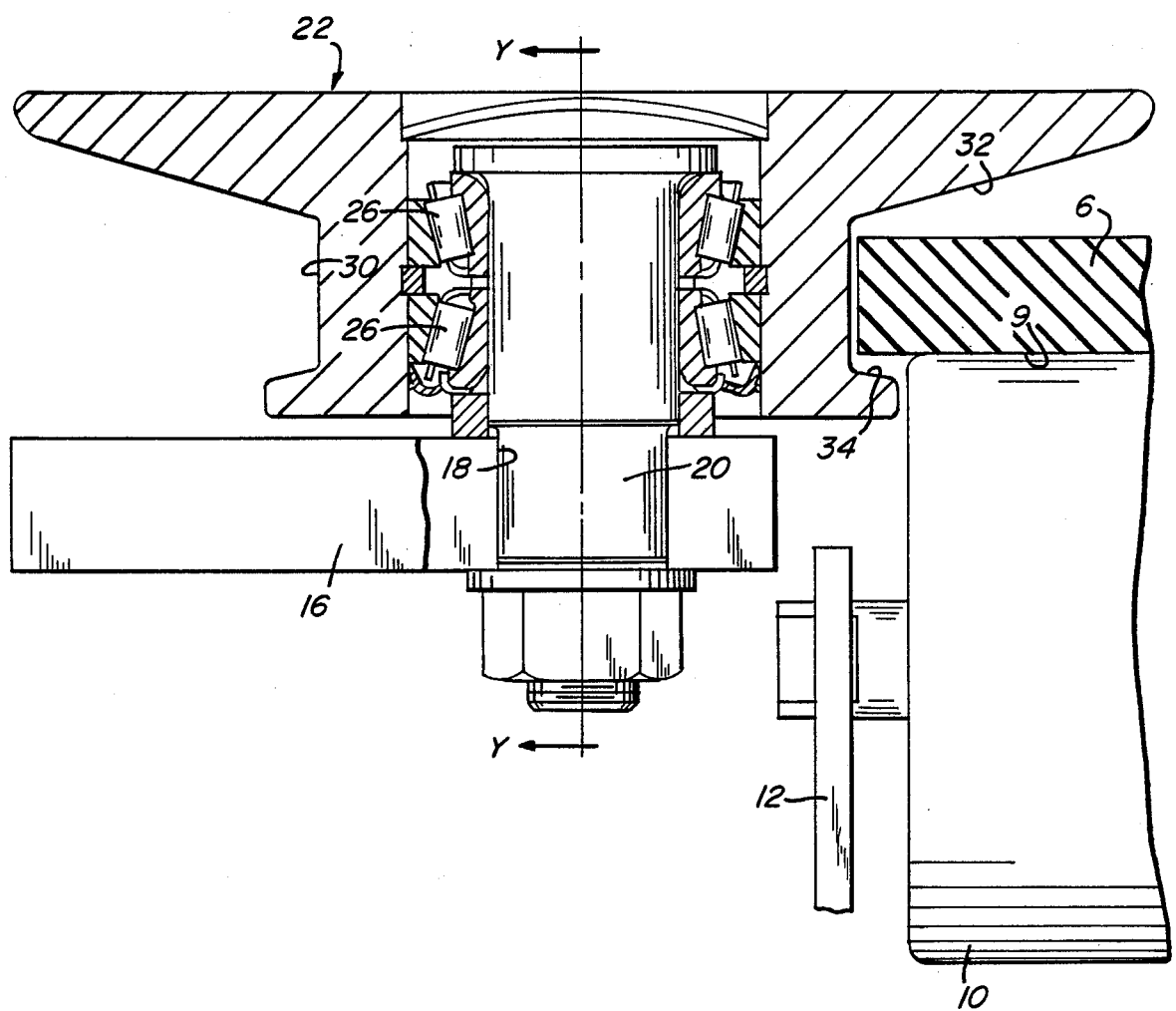
FIG. 2 is an enlarged view of an edge roller as shown in FIG. 1 which is partially in section and which illustrates the position of the return run and the return edge roller adjacent thereto.

The invention of this application relates to the development of a conveyor system as shown in the co-pending U.S. patent application Ser. No. 06/080,760 and for a more complete description of the structure supporting an orbital conveyor belt and the operation thereof the disclosure of Ser. No. 06/080,760 is incorporated herein. In the art of orbital belt conveyors it is well known to support an upper troughed conveying run 4 by means of a plurality of troughing rollers with the conveying run 4 being in overlying relationship to a lower flat return run 6 which return run 6 is supported by return idlers or rollers. Such troughing and return rollers have been supported by various suitable structures with the support structure 2, shown in FIG. 1, being applicant's presently preferred structure to permit the runs 4 and 6 to travel through a path which is curved in a horizontal direction as described in Ser. No. 06/080,760. As shown support 2 comprises an open generally rectangular framework having a lower rigid frame member 8 to which a pair of longitudinally spaced brackets 12 are suitably rigidly secured to support an elongated horizontally extending rotatable return roller 10 therebetween. Roller 10 is of a suitable known construction for supporting the lower return run 6 for movement thereover; however, roller 10 is of a length less than the width of run 6. As is customary roller 10 is supported with respect to run 6 such that the central longitudinal plane of the roller 10 is coincident with the longitudinal axis of run 6 as shown by the axis X—X; however, in actual operation it is known that the longitudinal axis of the run 6 will shift away from the central plane 9 of roller 10 when run 6 traverses a curve. Any suitable form of roller can be used for the roller 10 to provide the necessary support for run 6 through its return travel such as the roller 10 having a continuous supporting surface 9. Support 2 has a formed side members 14 at each side thereof to each lower portion of which a suitable horizontally inwardly extending formed bracket 16 is suitably rigidly secured. Each bracket 16 has a suitable bore portion 18 adjacent the inner end thereof which suitably receives a central shaft 20 of an edge roller 22. Each shaft 20 is rigidly secured within bore portion 18 in any suitable manner such as a lowermost nut and thread structure as shown. Each roller 22 has a formed housing 24 rotatably supported for coaxial rotation on the upper portion of shaft 20 in any suitable manner such as tapered roller bearings 26 as shown.

Each housing 24 has a formed outer configuration to support the outer edge of a conveyor run which consists of a central portion having a cylindrical outer surface 30 having a central axis which is coincident with the central axis of rotation Y—Y of the housing 24 and the stationary central axis of the shaft 20. An upper circumferentially continuous flange portion of housing 24 extends outwardly therefrom with a lower surface 32 thereof extending both upwardly and outwardly with respect to the upper end of surface 30 at a suitable angle to guide the outer edge of a belt run as hereinafter described. A lower circumferentially continuous flange portion of housing 24 extends outwardly therefrom with an upper surface 34 thereof extending both downwardly and outwardly with respect to the lower end of surface 30 at a suitable angle to guide the outer edge of a belt run as hereinafter described. The outer edge of each of the lower flange portions is located outwardly of and closely adjacent to the plane of the outer end of the return roller 10 with the upper surface 34 being located below the plane of the upper edge of roller 10.

It is to be realized the conveyor belting is supplied commercially in standard widths with the belting illustrated representing a 36 inch belt. A 36 inch belt width is a nominal dimension with such belting having a transverse width of 36 ¾"+0.00-0.25. Heretofore it has been common practice (see the previously identified prior art patents) to support the runs 4 and 6 throughout their entire transverse width by engagement with the upper surface of the supporting roller structures. With respect to the return run 6 the roller 10 is of any suitable known structure; however, with respect to the prior art the roller 10 is of a length so that each of the edges of run 6 overhang the roller 10 and are unsupported by the roller 10. With such widths of roller 10 and run 6 the lower surface of the run 6 is spaced above the upper surface 34 of each of the edge rollers 22 adjacent the ends of roller 10. Further each lower roller 22 is supported so that the surfaces 30 thereof are located closely adjacent the adjacent vertical extent of the outer edges of the run 6; respectively, with the vertical extent of the outer edges being centered with respect to the surfaces 30, that is, the central transverse plane of run 6 is coincided with the central transverse plane of each of the adjacent cylindrical surfaces 30. Surfaces 30 of the lower rollers 22 are horizontally spaced from the adjacent plane of the ends of roller 10; respectively, so that the portions of run 6 overlying surfaces 34 do not deflect downwardly due to their unsupported weight; that is, the beam strength of the belting forming run 6 maintains the outer edges of the run 6 in planes as though such outer edges were supported by a roller 10. Lower rollers 22 are also supported by the brackets 16 so that the portion of surfaces 30 adjacent the outer edges of run 6 are parallel to the vertical extent of the outer edges of run 6, respectively. It will be realized that the vertical extent of the outer edges of run 6 will not necessarily be true planar surfaces due to manufacturing variations in conveyor belting. With the axis of rotation Y—Y of the lower rollers 22 extending vertically and perpendicular to the horizontally extending rotational axis of roller 10 surfaces 30 are parallel to the outer edges of run 6 to the extent obtainable.

It will be realized that the heretofore described orientation of the unsupported edges of the run 6 with respect to the lower rollers 22 represents the desired design orientation when the run 6 is centered with respect to the horizontally extending roller 10. In use, the roller 10 is displaced from the horizontal orientation shown so that the described orientation of the entire structure is not necessarily maintained during such use. See Ser. No. 06/080,760 for a further description of the manner in which support structure 2 moves during operation. Thus, the description herein is to be understood to be with reference to a horizontally extending roller 10.

As stated this invention provides proper support for the runs 4 and 6 when the runs 4 and 6 traverse a horizontally curved path and with a curved run 6 the unsupported outer edge of run 6 having the smaller radius of curvature in the horizontal plane of curvature (that is, the inner edge of run 6) is forced into engagement with the surface 30 adjacent thereto while the outer unsupported edge of run 6 having the larger radius of curvature is the horizontal plane will be elongated with respect to the length of such edge when traversing a linear path. Further, since the belt supporting structure of this invention permits the run 6 to be curved to either side of a linear path either of the lower rollers 22 may become engaged by an unsupported edge of run 6. Accordingly for the purposes of understanding this invention the operation of the lower rollers 22 is being described with the lower left roller 22 being considered the inner roller with respect to the radius of curvature of the run 6.

With the run 6 being horizontally curved such that the run 6 is displaced leftward (with reference to FIG. 1) the leftward vertical edge of run 6 will engage the surface 30 of the lower left roller 22 and, when the run 6 is running at an operating speed, cause the lower left housing 24 to rotate such that there is essentially no relative motion between the lower left surface 30 and the left edge of the run 6. At the same time and dependent upon the magnitude and direction of the forces within run 6 at the left edge, the left edge of run 6 can be forced upwardly or downwardly on the engaged surface 30. Normally the forces in the left edge of run 6 when run 6 has the smaller radius of curvature forces the left edge of run 6 downwardly on the engaged surface 30. With the structure of this invention the left edge of run 6 when initially forced downwardly will remain in engagement with the lower left surface 30 since the lower left surface 30 extends below the lower most left corner of run 6. Under conditions wherein the left edge of run 6 is forced downwardly into engagement with surface 34 such engagement will support the lower left corner of run 6 outwardly of the left end of roller 10 so that the left end of run 6 will not be pinched between the left end of the roller 10 and the outer right side edge of the lower flange of the lower left roller 22. Such support of the left edge of run 6 by surface 34 is of particular importance as without such support return runs such as run 6 have consistently been pinched between the left end of a roller such as roller 10 and an adjacent side roller. Such pinching of the edge of run 6 between the edge roller and the support roller when repeated for each edge roller and support roller throughout the length of the return run causes small particles of the carcass of the belting to be dislodged such that as more and more particles are dislodged the belt is rendered unsuitable for continued service notwithstanding that the remainder of the belt is still usuable. In this regard it should be noted that either lower edge of a return run is subject to pinching depending upon the horizontal curvature of the return run.

At the same time the left edge of run 6 is being forced downwardly the right edge of run 6 is being elongated as compared to the length when the run 6 is traveling in a linear path which elongation creates forces in the right overhanging edge. Normally such elongation forces, dependent upon the magnitude and direction of such forces, causes the right edge of run 6 to curl upwardly and inwardly as the run 6 attempts to relieve such forces. As the right edge of run 6 initiates sufficient curling the upper right edge engages the surface 32 of the upper flange of the right side roller 22. Inasmuch as the upper surface or run 6 is not restrained in the matter as lower surface of run 6 is by engagement with the roller 10 a substantial portion of the right side of run 6 must be controlled by the roller 22. Accordingly the upper flange of the rollers 22 are substantially larger in cross sections and extent than the lower flanges of the rollers 22 to provide sufficient strength in the upper flange to restrain a curling outer edge of run 6. Surface 32 is sloped at an angle, as shown, such that as the forces in the curling edge of run 6 deminish the engagement of the surface 32 with the curling edge will guide the curling edge outwardly and downwardly. Similarily the surface 34 is sloped at an angle to guide the lower edge of run 6 outwardly and upwardly.

From the studies to date it is preferred that the axis of rotation of each lower roller 22 and the return roller 10 be in a common vertical plane so that surfaces 34 can exert a force due directly upon the outer edges of run 6 rather than permit an unsupported portion of the run 6 to deflect downwardly. Such common vertical plane is not essential to obtain certain advantages of the rollers 22; however, for best operation such common vertical plane should be used.

As is common the conveying run 4 is supported by a suitable troughing idler assembly which is of any suitable construction. As is common a three sectional troughing idler assembly is provided having a central horizontally extending idler 40 with a wing or side idler 42 adjacent each end of idler 40. As is known idlers 40 and 42 support the run 4 with the central longitudinal axis of run 6 and the central transverse plane of idler 40 being coincident with the axis X—X when run 6 is in the design position shown. Idler 40 is suitably secured for rotation between intermediate portions 44 of said members 14 which portions 44 extend inwardly with relation to the sides of support structure 2. Wing rollers 42 are suitably support for rotation by suitable brackets 46 suitably rigidly secured to respective portions 44. As is known the rotation axis of rollers 42 extend upwardly and outwardly with respect to the central rotation axis of roller 40 at an angle to provide the desired troughing of run 4. The outer ends of the wing rollers 42 are spaced inwardly of the outer edges of the run 4 to provide unsupported overhanging edges at each side of run 4 which has the same lateral unsupported extent as the unsupported extent of the edges of run 6. Edge rollers 22 are supported adjacent each of the overhanging edges of run 4 in any suitable manner such as by brackets 16 is suitably rigidly secured to side members 14. Brackets 16 support the upper rollers 22 in the same manner as the brackets 12 support the lower rollers 22 and are located with respect to the side member 14 so that the axis of rotation of the upper rollers 22 extends parallel to the sides of run 4 respectively to the extent such parallelism is obtainable with commercial conveyor belting. Thus the upper rollers 22 are supported so that their axis of rotation Y—Y are perpendicular to the axis of rotation of the adjacent wing idlers 42 respectively. Upper rollers 22 are supported outwardly of the side of run 4 respectively, so that the same guiding and support of the overhanging edges of run 4 is provided by upper rollers 22 as previously described with relation to lower rollers 22 and run 6. Upper rollers 22 prevent the described penching of the lower edges of run 4; however, it is to be noted that the lower edges of run 4 form the upper edges of run 6 and vise-versa. Thus, the edges of the conveyor belt are protected against excessive wear when guided as described herein.

Although a preferred embodiment of the invention as presently contemplated has been described and shown those skilled in the art to which this invention related will readily discern that modifications of this invention can be utilized in various ways without departing from the spirit and scope of this invention as set forth in the following claims.

I claim:

1. In a conveyor structure in which horizontally spaced portions of an elongated horizontally extending selectively curved run of an orbitally moving conveyor belt of substantially uniform cross section having sufficient flexiblity to form an upper troughed conveying run and an underlying flat return run, are supported by horizontally spaced idler roller assemblies with the outer edges of such run being outwardly adjacent the respective outer ends of each of said roller assemblies when such run traverses a straight path and wherein edge rollers are spaced horizontally of such run outwardly adjacent said outer edges, respectively, when such run traverses a straight path, the improvement comprising:

said edge rollers having cylindrical outer surfaces rotatable about stationary central axes thereof, respectively, opposed ones of said outer surfaces being spaced outwardly from such outer edges, respectively, when such run traverses a straight path, each of said axes extending generally in the same direction as the traverse extent of such outer edge adjacent thereto extends when such run traverses a straight path;

each of said edge rollers having a flange extending radially outwardly from the lower end of said cylindrical outer surface thereof;

said flanges having upwardly facing annular surfaces spaced below the undersurface of the seriatim portions of such run adjacent thereto, respectively, when such run traverses a straight path, each of said annular surfaces being spaced below the undersurface of the portion of such run adjacent thereto a distance to permit said seriatim portions to deflect downwardly into engagement therewith;

said cylindrical outer surfaces and said annular surfaces being located with respect to such outer edges that, when such run traverses a curved path and such run is laterally displaced with seriatim portions of one of said outer edges moving into seriatim engagement with a number of said cylindrical outer surfaces on one side of such run, said annular surfaces of the flanges below the engaged cylindrical outer surfaces are engaged by said seriatim portions to prevent said seriatim portions from engaging the roller assemblies of said roller assemblies adjacent said engaged cylindrical outer surfaces.

2. In a conveyor structure as set forth in claim 1 wherein said stationary axes of each of said edge rollers and the rotative axes of said roller assemblies adjacent thereto are essentially in a common plane.

3. In a conveyor structure as set forth in claim 1 where such run is the troughed conveying run and a flat return run is prevented from engaging additional roller assemblies supporting such return run by additional edge rollers of the same structure and location relative to such return run as said first mentioned edge rollers are with respect to such conveying run.

4. In a conveying structure as set forth in claim 3 wherein the rotative axes of said additional roller assemblies and said additional edge rollers are essentially in a common plane.

5. A conveying structure as set forth in claim 1 wherein each of said edge rollers has an upper flange portion extending radially outwardly from the upper end of said cylindrical outer surface, said upper flange portion having a downwardly facing annular surface located to prevent the other of said outer edges from turning inwardly with respect to such a run.

6. A conveying structure as set forth in claim 1 wherein the axis of rotation of said edge rollers is at least essentially perpendicular to the axis of rotation of the portion of the idler means adjacent thereto.

7. A conveying structure as set forth in claim 1 wherein each of said annular surfaces extends at an angle with respect to seriatim portions to direct said seriatim portions upwardly.

8. A conveying structure as set forth in claim 1 wherein a pair of overlying traveling conveyor belt runs is guided by identically positioned edge rollers.

9. A conveying structure as set forth in claim 3 in which each of said flanges has tapered surfaces for guiding the edge adjacent thereto.

10. A conveying structure as set forth in claim 3 wherein the axis of rotation of said edge rollers is at least essentially perpendicular to the axis of rotation of the potion of the idler means adjacent thereto.

11. A conveying structure as set forth in claim 3 wherein each of said flanges has an upwardly facing surface extending at an angle with respect to the edge adjacent thereto to direct the edge adjacent thereto upwardly.

* * * * *